United States Patent
Zhang

(10) Patent No.: US 11,387,990 B2
(45) Date of Patent: Jul. 12, 2022

(54) METHOD AND APPARATUS FOR GENERATING DESCRIPTION INFORMATION

(71) Applicant: Alipay (Hangzhou) Information Technology Co., Ltd., Zhejiang (CN)

(72) Inventor: Hong Zhang, Zhejiang (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 0 days.

(21) Appl. No.: 17/358,539

(22) Filed: Jun. 25, 2021

(65) Prior Publication Data

US 2022/0038268 A1 Feb. 3, 2022

(30) Foreign Application Priority Data

Jul. 31, 2020 (CN) .......................... 202010759161.4

(51) Int. Cl.
*H04L 9/08* (2006.01)
*G06F 16/28* (2019.01)

(52) U.S. Cl.
CPC .......... *H04L 9/0847* (2013.01); *G06F 16/288* (2019.01); *H04L 9/0825* (2013.01); *H04L 9/0869* (2013.01); *H04L 2209/38* (2013.01)

(58) Field of Classification Search
CPC ... H04L 9/0847; H04L 9/0825; H04L 9/0869; H04L 2209/38; G06F 16/288
See application file for complete search history.

(56) References Cited

U.S. PATENT DOCUMENTS

| | | | | |
|---|---|---|---|---|
| 2021/0011905 | A1* | 1/2021 | Uhr | H04L 9/30 |
| 2021/0119807 | A1* | 4/2021 | Chen | H04L 9/3297 |
| 2021/0271765 | A1* | 9/2021 | Murdoch | G06F 21/6218 |

FOREIGN PATENT DOCUMENTS

| | | |
|---|---|---|
| CN | 110598386 A | 12/2019 |
| CN | 111046115 A | 4/2020 |
| CN | 111241301 A | 6/2020 |
| CN | 111461742 A | 7/2020 |

OTHER PUBLICATIONS

W3C Working Group "Decentralized Identifiers (DIDs) v1.0: Core architecture data model, and representations" [online] World Wide Web Consortium, Jul. 28, 2020 [retrieved Oct. 16, 2021], Retrieved from the Internet: URL: https://www.w3.org/TR/2020/WD-did-core-20200728/(Year: 2021).*

* cited by examiner

*Primary Examiner* — Taghi T Arani
*Assistant Examiner* — Joshua Raymond White
(74) *Attorney, Agent, or Firm* — Seed IP Law Group LLP

(57) ABSTRACT

One or more implementations of the present specification provide a method and an apparatus for generating description information. The method for generating description information includes: determining local DIDs registered in a first blockchain, and generating a relationship graph of all local DIDs based on data that is related to individual local DIDs and that is maintained by a first blockchain node corresponding to the first blockchain; determining, from the relationship graph and based on a target local DID corresponding to a target object, an associated local DID related to the target local DID; and generating description information of the target object based on (a) an association relationship between the target local DID and the associated local DID and (b) data related to the associated local DID.

19 Claims, 9 Drawing Sheets

METHOD AND APPARATUS FOR GENERATING DESCRIPTION INFORMATION

BACKGROUND

Technical Field

One or more implementations of the present specification relate to the field of terminal technologies, and in particular, to a method and an apparatus for generating description information.

Description of the Related Art

With the advent of the information age, quick access to description information of objects such as users, organizations, and institutions can greatly facilitate people's life and work. For example, in business scenarios, platforms can generate corresponding user portraits based on historical browsing records of users, so that products can be marketed to the users more accurately.

BRIEF SUMMARY

One or more implementations of the present specification provide a method and an apparatus for generating description information.

The technical solutions provided in the one or more implementations of the present specification are as follows:

According to a first aspect of the one or more implementations of the present specification, a method for generating description information is provided, including: determining local decentralized identifiers (DIDs) registered in a first blockchain, and generating a relationship graph of all local DIDs based on data that is related to individual local DIDs and that is maintained by a first blockchain node corresponding to the first blockchain; determining, from the relationship graph and based on a target local DID corresponding to a target object, an associated local DID related to the target local DID; and generating description information of the target object based on (a) an association relationship between the target local DID and the associated local DID and (b) data related to the associated local DID.

According to a second aspect of the one or more implementations of the present specification, an apparatus for generating description information is provided, including: a first determining unit, configured to determine local DIDs registered in a first blockchain, and generate a relationship graph of all local DIDs based on data that is related to individual local DIDs and that is maintained by a first blockchain node corresponding to the first blockchain; a second determining unit, configured to determine, from the relationship graph and based on a target local DID corresponding to a target object, an associated local DID related to the target local DID; and a generation unit, configured to generate description information of the target object based on (a) an association relationship between the target local DID and the associated local DID and (b) data related to the associated local DID.

According to a third aspect of the one or more implementations of the present specification, an electronic device is provided, including: a processor; and a memory configured to store executable instructions of the processor, where the processor performs the method according to the first aspect by running the executable instructions.

According to a fourth aspect of the one or more implementations of the present specification, a computer readable storage medium is provided. The computer readable storage medium stores computer instructions. When the computer instructions are executed by a processor, the steps of the method according to the first aspect are implemented.

DETAILED DESCRIPTION

Figure 1A:
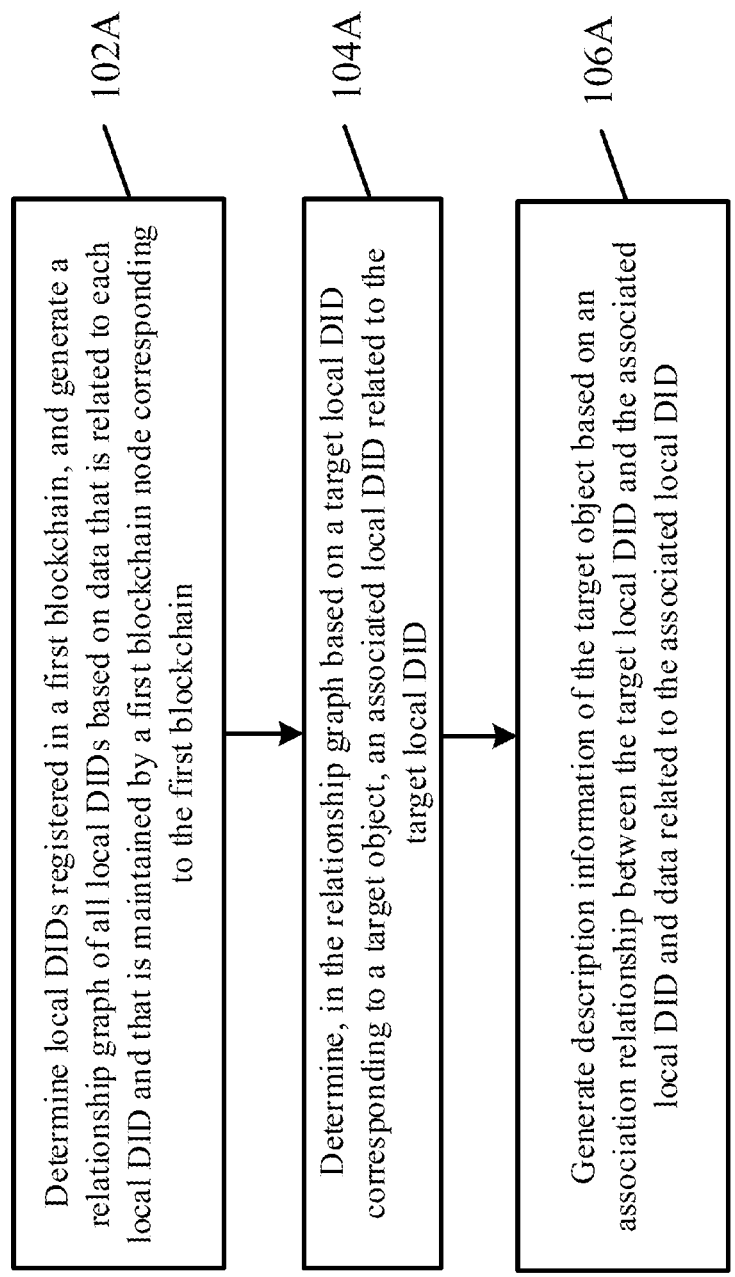
FIG. 1A is a flowchart illustrating a method for generating description information according to an example implementation of the present specification.

Example implementations are described in detail herein, and examples of the implementations are shown in the accompanying drawings. When the following descriptions are related to the accompanying drawings, unless otherwise indicated, same numbers in different drawings indicate same or similar elements. The implementations described in the following example implementations do not represent all implementations consistent with one or more implementations of the present specification. On the contrary, the implementations are merely examples of apparatuses and methods that are described in the appended claims in detail and consistent with some aspects of one or more implementations of the present specification.

It should be noted that in other implementations, steps of a corresponding method are not necessarily performed in the order shown and described in the present specification. In some other implementations, the steps included in the method can be fewer or more than those described in the present specification. In addition, a single step described in the present specification can be divided into multiple steps for description in other implementations, and multiple steps described in the present specification can be combined into a single step for description in other implementations.

Decentralized identifier (DID) is a type of identifier including a string, and is used to represent a digital identity. Compared with a conventional identifier, the DID does not require a central registration authority, and a same entity can usually have multiple identities (namely, objects in the present specification), and each identity is assigned a unique DID. There is usually no association between different identities. This can effectively avoid collection of owner identity information. In fact, the DID makes use of decentralization and non-tamperability characteristics of blockchain technology, so that digital identities are truly owned and controlled by users, and the users do not need to worry about information leakage by the central registration authority. In the present specification, the word "blockchain" can also refer to a corresponding blockchain network in applicable contexts or scenarios.

A DID corresponding to any object is usually registered by a user in a corresponding blockchain. When the DID is registered, an identity public key corresponding to the DID further needs to be provided to generate a corresponding DID document. An identity private key corresponding to the DID is held by an owner of the DID. On this basis, the identity public key stored in the DID document can be used with the identity private key held by the owner of the DID to achieve identity verification of the owner. In addition to the identity public key, the DID document can further include other information related to the DID, for example, a relationship between the DID and other DID(s) and event(s) in which an identity corresponding to the DID participates.

Based on the DID features described above, the present specification proposes a method for generating description information. In the method, description information of any object can be generated based on DIDs registered by different objects in the blockchain and data related to the DIDs.

FIG. 1A is a flowchart illustrating a method for generating description information according to an example implementation of the present specification. As shown in FIG. 1A, the method can include the following steps:

Step 102A: Determine local DIDs registered in a first blockchain, and generate a relationship graph of all local DIDs based on data that is related to individual local DIDs and that is maintained by a first blockchain node corresponding to the first blockchain.

The technical solution in the present specification can be applied to a blockchain node or a device other than the blockchain node. For example, when the technical solution is applied to the blockchain node, the blockchain node is not only responsible for maintaining each local DID and data related to individual local DIDs, but also responsible for generating a relationship graph and description information, thereby implementing centralized management of information. Moreover, multiple devices do not need to interact with each other frequently, thereby reducing occupied bandwidth. When the technical solution is applied to a device other than the blockchain node, the device can interact with the blockchain node to generate a relationship graph and description information. Compared with being applied to the blockchain node, the method can reduce occupied processing resources of the blockchain node. Whether the technical solution in the present specification is specifically performed by the blockchain node can be determined by a person skilled in the art based on actual requirements. This is not limited in the present specification.

Regardless of whether the technical solution in the present specification is applied to the blockchain node, the technical solution can be performed by any electronic device having a processing function, for example, can be performed by a mobile terminal such as a mobile phone, a tablet computer, a personal digital assistant (PDA), a wearable device (such as smart glasses or a smart watch), or a fixed terminal such as a PC or a smart TV. A specific type of electronic device to which the technical solution is applied can be determined by a person skilled in the art based on actual conditions. This is not limited in the present specification.

Description information of a certain object in the present specification can include any information related to the object. Specifically, description information of a certain object is usually related to a type of the object. For example, when the type of the object is a person, the object can be a user identity of the person on a certain shopping platform. In this case, the description information of the object can be a user portrait of the user in a shopping scenario. Certainly, the example is merely illustrative. This is not limited in the present specification.

In related technology, data related to any object usually needs to be collected before description information of the object is generated, and then the collected data is analyzed and processed. For example, when the object is a user, historical browsing records of the user on a shopping platform usually need to be traversed, and then the obtained browsing records are analyzed and processed to obtain a user portrait of the user. For another example, when the object is a company, data related to the company usually needs to be obtained in multiple ways, and then the obtained data is analyzed and processed to obtain related information about the company. It can be seen that generating description information of any object in the related technology is usually relatively complicated, and the content thereof is relatively single-sided, typically description information of the object in a certain aspect, and is not comprehensive enough.

In the present specification, when the user registers a local DID of any object in the first blockchain, the user needs to upload data related to the object as data related to the local DID. Based on this, the first blockchain node corresponding to the first blockchain can generate a relationship graph of all local DIDs based on maintained data related to individual local DIDs. It should be understood that as the number of local DIDs registered in the first blockchain increases, the amount of data related to the local DIDs maintained in the first blockchain is very large, and content of the relationship graph generated based on the data is also very rich. Therefore, when the user needs to obtain description information of a certain object, the user can obtain the description information of the object from the relationship graph only by providing a local DID corresponding to the object. As such, efficiency of obtaining the description information is greatly improved, and richness of the obtained description information is increased. In the present specification, data related to a local DID can include static attribute information related to a corresponding object. The static attribute information in the present specification is relatively constant information for the corresponding object. For example, when the type of the object is a person, the static attribute information can include a family, a position, an address, a company address, a colleague, a department, and the like. For another example, when the object is a device, the static attribute information can include an appearance, a manufacturer, an owner, a parameter, a geographic location, and the like. Certainly, the example is merely illustrative. A specific meaning of the static attribute information can be determined by a person skilled in the art based on actual requirements. This is not limited in the present specification. It should be understood that there is usually a certain association between the data related to all the local DIDs. In the present specification, the above relationship graph can be generated based on the association. For example, another object having a colleague relationship with an owner of a certain local DID is recorded in data related to the local DID. In this case, an association relationship can be established between the local DID and a local DID corresponding to the another object, to generate the above relationship graph or record the relationship in a generated relationship graph.

In practice, a relationship between multiple objects represented by local DIDs is not usually static. Therefore, dynamic service data uploaded by a service system can further be obtained to adjust the generated relationship graph based on the dynamic service data. The dynamic service data is related to at least one local DID in the first blockchain. When the relationship graph is adjusted by using the dynamic service data, the relationship graph in the present specification can be adjusted based on changes of an actual situation, so that information represented by the relationship graph always conforms to the actual situation, thereby improving the accuracy of description information generated based on the relationship graph. It should be emphasized that the service system is a system that can provide dynamic service data related to each object. The dynamic service data may be related to a service or may not be related to a service. For example, the dynamic service data can merely be used to describe an event that occurs between objects and that is not related to the service.

In the present specification, the relationship graph can be adjusted by using the dynamic service data by using multiple methods.

In an implementation, relationship data of local DIDs existing in the relationship graph can be directly adjusted based on the dynamic service data uploaded by the service system. In the implementation, the dynamic service data is not recorded. Therefore, the relationship graph can be adjusted without increasing storage space occupied by the relationship graph.

In an implementation, after the dynamic service data uploaded by the service system is received, a local DID corresponding to the dynamic service data can be registered in the first blockchain, and relationship data related to the local DID corresponding to the dynamic service data is added to the relationship graph. In the implementation, the corresponding local DID is registered for the dynamic service data in the first blockchain, so that the relationship data related to the dynamic service data is also recorded in the first blockchain. In other words, in the method, adjustment on the relationship graph can be traced while the relationship graph is adjusted.

In the present specification, data that is related to any local DID and that is maintained by a blockchain node can be obtained by using multiple methods.

In an implementation, data related to any local DID can be recorded on a client and uploaded to a blockchain transaction at the first blockchain node. In the implementation, the user can upload, to the first blockchain node by using the client, the blockchain transaction in which the data related to the local DID is recorded, so that the first blockchain node can maintain the data.

In an implementation, after receiving the blockchain transaction uploaded by the user by using the client, the first blockchain node can execute the blockchain transaction, and use status data generated through the execution as the data related to the local DID.

In an implementation, because the user can register DIDs corresponding to a same object in different blockchains, it is very possible that related data of an object represented by any local DID, as described above, has been maintained in a second blockchain different from the first blockchain. In the present specification, the data can be referred to as data related to an external DID. In the second blockchain, the external DID represents the object represented by the local DID in the first blockchain, and the first blockchain node has recorded a correspondence between the local DID and the external DID. Based on this, it is possible that the data related to any local DID is not obtained from the blockchain transaction uploaded by the client, but is directly obtained, based on the correspondence between the local DID and the external DID, from the second blockchain in which the data related to the external DID is maintained. As such, the user does not need to upload the data related to the object represented by the local DID again. Instead, a device directly obtains data that is related to the same object and that is maintained in another blockchain, thereby greatly simplifying user operations and improving efficiency of obtaining data.

In practice, data related to any local DID can be obtained by using one of the above methods, or can be obtained by using at least two of the above methods. This can be specifically determined by a person skilled in the art based on actual requirements, and is not limited in the present specification.

In the above three methods for obtaining the data related to any local DID, the first blockchain node needs to record the correspondence between the local DID and the corresponding external DID. In the present specification, the first blockchain node can obtain and record the correspondence by using multiple methods.

In an implementation, the first blockchain node can obtain the external DID from a second blockchain node corresponding to the second blockchain, to establish a relationship between a local DID and an external DID. Specifically, the first blockchain node can send a correspondence establishment request to the second blockchain node to request the external DID from the second blockchain node. The correspondence establishment request includes verifiable authorization information issued by an owner of the local DID, and the verifiable authorization information is used to prove that the owner of the local DID allows establishment of the correspondence. After receiving the correspondence establishment request, the second blockchain node can verify the verifiable authorization information, and return the external DID to the first blockchain node after the verification succeeds. The first blockchain node can establish and record the correspondence between the local DID and the external DID based on the received external DID. In the implementation, the verifiable authorization information can be a verifiable claim (VC) in the related technology, and a specific verification method thereof is similar to that in the related technology. Details are omitted herein for simplicity. The correspondence establishment request can further include a unique identifier corresponding to the object represented by the local DID, so that the second blockchain node determines the external DID corresponding to the object based on the unique identifier. In the implementation, the verifiable authorization information needs to be verified to determine that the owner of the local DID allows establishment of the correspondence. Moreover, whether the object represented by the local DID in the first blockchain is the same as the object represented by the external DID in the second blockchain also needs to be verified. Specifically, after receiving the correspondence establishment request, the second blockchain node can generate a random character used to verify an identity of the owner of the local DID, and send the random character to the first blockchain node. The first blockchain node can provide the random character to the owner of the local DID, so that the owner of the local DID signs the received random character by using an identity private key. The signed random character is returned by the first blockchain node to the second blockchain node. After receiving the signed random character, the second blockchain node can verify the signed random character by using an identity public key of an owner of the external DID, and return the external DID to the first blockchain node after the verification succeeds. The identity public key is recorded in a DID document corresponding to the external DID in the second blockchain.

In another implementation, the external DID can be directly provided by the owner of the local DID for the first blockchain node. In the implementation, the first blockchain node needs to verify whether an object represented by the external DID in the second blockchain is the same as the object represented by the local DID in the first blockchain.

In some cases, the verification process can be performed by the first blockchain. Specifically, after receiving the external DID sent by the owner of the local DID, the first blockchain node can generate the random character used to verify the identity of the owner of the local DID, and send the random character to the owner of the local DID, so that the owner of the local DID signs the random character by using the identity private key. Furthermore, the first blockchain node can send the received external DID to the second blockchain node, and receive an identity public key that is returned by the second blockchain node and that corresponds to the external DID. Based on this, the signed random character can be verified based on the received identity public key. If the verification succeeds, the correspondence between the local DID and the external DID can be generated and recorded.

In some cases, the verification process can be performed by the second blockchain node. Specifically, when receiving the external DID sent by the owner of the local DID, the first blockchain node can send the external DID to the second blockchain node, so that the second blockchain node generates a random character used to verify the identity of the owner of the local DID, and returns the random character to the first blockchain node. After receiving the random character returned by the second blockchain node, the first blockchain node can give the random character to the owner of the local DID, so that the owner of the local DID signs the random character by using the identity private key, and the first blockchain node can send the signed random character to the second blockchain node. When receiving the signed random character, the second blockchain node can obtain the identity public key stored in the DID document corresponding to the external DID, and verify the signed random character by using the identity public key. When receiving verification success information returned by the second blockchain node, the first blockchain node can generate and record the correspondence between the local DID and the external DID.

In this case, the random character can alternatively be generated by the first blockchain node. Specifically, after receiving the external DID sent by the owner of the local DID, the first blockchain node can generate the random character used to verify the identity, and give the random character to the owner of the local DID, so that the owner of the local DID signs the random character by using the identity private key. Based on this, the first blockchain node can send the signed random character and the external DID to the second blockchain node. After receiving the external DID, the second blockchain node can search for the DID document corresponding to the external DID based on the external DID, obtain the identity public key stored in the DID document, and further verify the signed random character by using the identity public key. The first blockchain node can generate and record the correspondence between the local DID and the external DID after receiving a returned result indicating a verification success.

It should be declared that, as mentioned above, in a DID registration process, a corresponding DID document needs to be generated, and at least an identity public key of an owner of the DID needs to be stored in the DID document. Based on this, the blockchain node maintains the DID and the DID document corresponding to the DID. Therefore, the identity public key used in the process of verifying the identity of the owner of the local DID is recorded in the DID document corresponding to the external DID in the second blockchain. It should be declared that DIDs registered by any owner for an object (or an identity) on different blockchains can share a set of asymmetric keys, or a set of asymmetric keys can be configured for a DID registered on each blockchain. For example, the local DID and the external DID are respectively DIDs registered in the first blockchain and the second blockchain for the same object. The local DID and the external DID can share a set of asymmetric keys, or a set of asymmetric keys can be configured for each of the local DID and the external DID. When a set of asymmetric keys are configured for each of the local DID and the external DID, in the above signing process, the identity private key corresponding to the external DID should be used for signing, so that the second blockchain node can perform verification based on the identity public key stored in the DID document corresponding to the external DID.

In the related technology, a DID generated for a certain object usually includes a prefix part and a suffix ID part. The suffix ID part usually has a large number of bits, and occupies large storage space. Therefore, in the present specification, although each local DID registered in the first blockchain still includes a prefix part and a suffix ID part, the suffix ID part meets the Base64 encoding rule, so that the number of bits of the suffix ID of the local DID in the present specification is less than the number of bits of the suffix ID of the DID in the related technology. Therefore, each local DID occupies smaller storage space of the first blockchain node. In practice, after a regular DID is generated for a certain object, the regular DID can further be simplified by using the Base64 algorithm, to obtain a local DID with a suffix ID meeting the Base64 encoding rule.

In the related technology, DIDs are usually registered only for two types of objects: persons and organizations. For example, a user DID is registered for a certain person on a shopping platform, or a company DID is registered for a certain company. The dimension is relatively single. In the present specification, DIDs can be generated for more types of objects. Specifically, in addition to persons and organizations, local DIDs can further be generated for objects such as devices, assets, and space. In other words, a type of an object represented by a local DID maintained in the first blockchain can include at least one of: a person, an organization, a device, assets, or space. Certainly, the example is merely illustrative. It should be understood that in addition to the foregoing types, there can be other types. Specifically, a type of an object for which a local DID is generated can be determined by a person skilled in the art based on actual requirements. This is not limited in the present specification.

It should be pointed out that the organization mentioned in the present specification can include a company, a government agency, a civil organization, and the like; the assets can include funds, real estate, a car, and the like; the device can be a mobile terminal such as a mobile phone and a tablet computer, or can be a fixed terminal such as a PC and a smart television; and the space can be virtual space such as a disk and a memory, or can be physical space such as a warehouse. Certainly, the example is merely illustrative. An object included in each type in the present specification can be determined by a person skilled in the art based on actual conditions. This is not limited in the present specification.

Figure 1B:
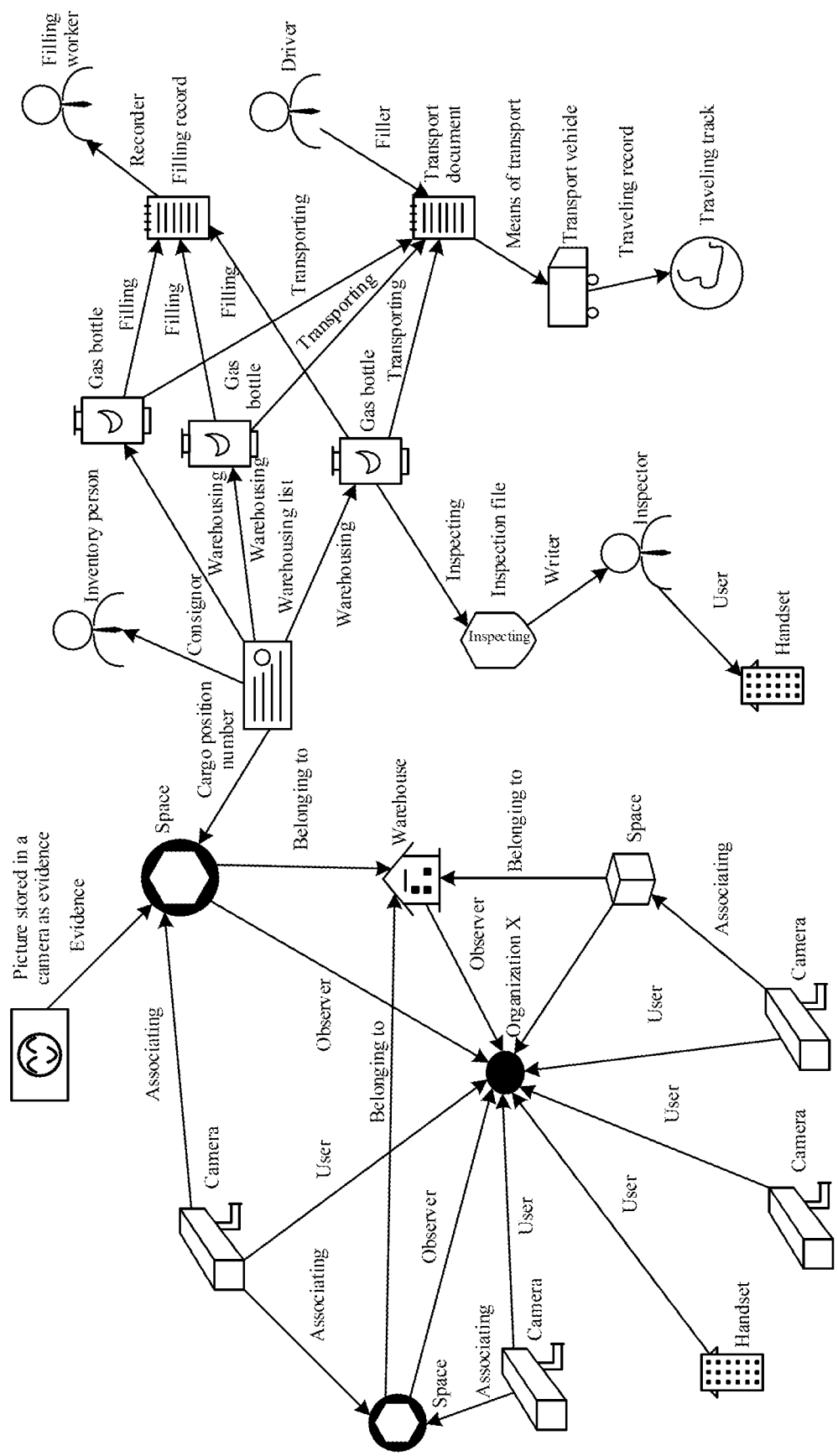
FIG. 1B is a schematic diagram illustrating a relationship graph according to an example implementation of the present specification.

For example, a relationship graph obtained based on the present specification can be shown in FIG. 1B. FIG. 1B shows the relationship graph in a freight scenario. It can be seen from FIG. 1B that, the relationship graph not only includes objects belonging to the human category such as a filling worker, a driver, and an observer, but also includes objects belonging to the device category such as a camera and a handheld machine, and further includes objects that are dynamic service data such as a transportation bill and a filling record. Based on this, when description information corresponding to any object in the relationship graph needs to be generated, another object related to the object can be directly obtained from the relationship graph, and the description information of the object can be generated with reference to related data of the another object.

It should be declared that FIG. 1B is merely a visualized schematic diagram illustrating the relationship graph generated based on a stored local DID and related data of the stored local DID. In a device, the relationship graph is usually stored in forms of a DID corresponding to each object and data describing a relationship between all DIDs.

Step 104A: Determine, from the relationship graph and based on a target local DID corresponding to a target object, an associated local DID related to the target local DID.

In the present specification, when the user requires generation of description information corresponding to the target object, the target local DID corresponding to the target object can be sent. It should be understood that an association relationship between all local DIDs is recorded in the relationship graph generated by using the above method, and data related to individual local DIDs is recorded in the first blockchain. The description information corresponding to the target object can be generated only by finding out the associated local DID related to the target local DID and information related to the determined associated local DID.

Step 106A: Generate the description information of the target object based on (a) an association relationship between the target local DID and the associated local DID and (b) data related to the associated local DID.

It can be learned from the technical solution that, in the technical solution in the present specification, the relationship graph used to represent the association relationship between all the local DIDs can be generated based on the data that is related to individual local DIDs and that is maintained in the first blockchain. Based on this, when the target local DID corresponding to the target object is received, the relationship graph can be searched for the associated local DID related to the target local DID, and the data related to the associated local DID is obtained from the first blockchain. Further, the description information of the target object is generated. In other words, in the present specification, the relationship graph used to represent the association relationship between all the local DIDs is pre-established, so that when description information needs to be generated for an object represented by any local DID in the relationship graph, description information of the object can be created rapidly. Therefore, a problem in that related technology that efficiency of generating description information is low because data related to any object needs to be collected, analyzed, and processed in real time when description information of the object is generated is avoided.

Further, data related to any local DID can be obtained by the first blockchain node from the second blockchain node that has stored data related to an object represented by the local DID, so that the user does not need to repeatedly upload, to different blockchains, data related to a same object, thereby implementing cross-chain compatibility between blockchains while reducing user operations.

In the present specification, the data related to the local DID can be obtained by using a cross-chain method. In the process, a correspondence between a local DID registered by an object in the first blockchain and an external DID registered by the same object in the second blockchain needs to be used. A process of generating the correspondence is described below. It should be declared that, in the following implementations, the first blockchain node corresponds to the first blockchain, and the second blockchain node corresponds to the second blockchain, in other words, the first blockchain node and the second blockchain node belong to different blockchains. In addition, the following client and the first blockchain node can be the same electronic device or can be different devices. When the following client and the first blockchain node are the same device, the following process in which the client interacts with the first blockchain node does not exist.

Figure 2:
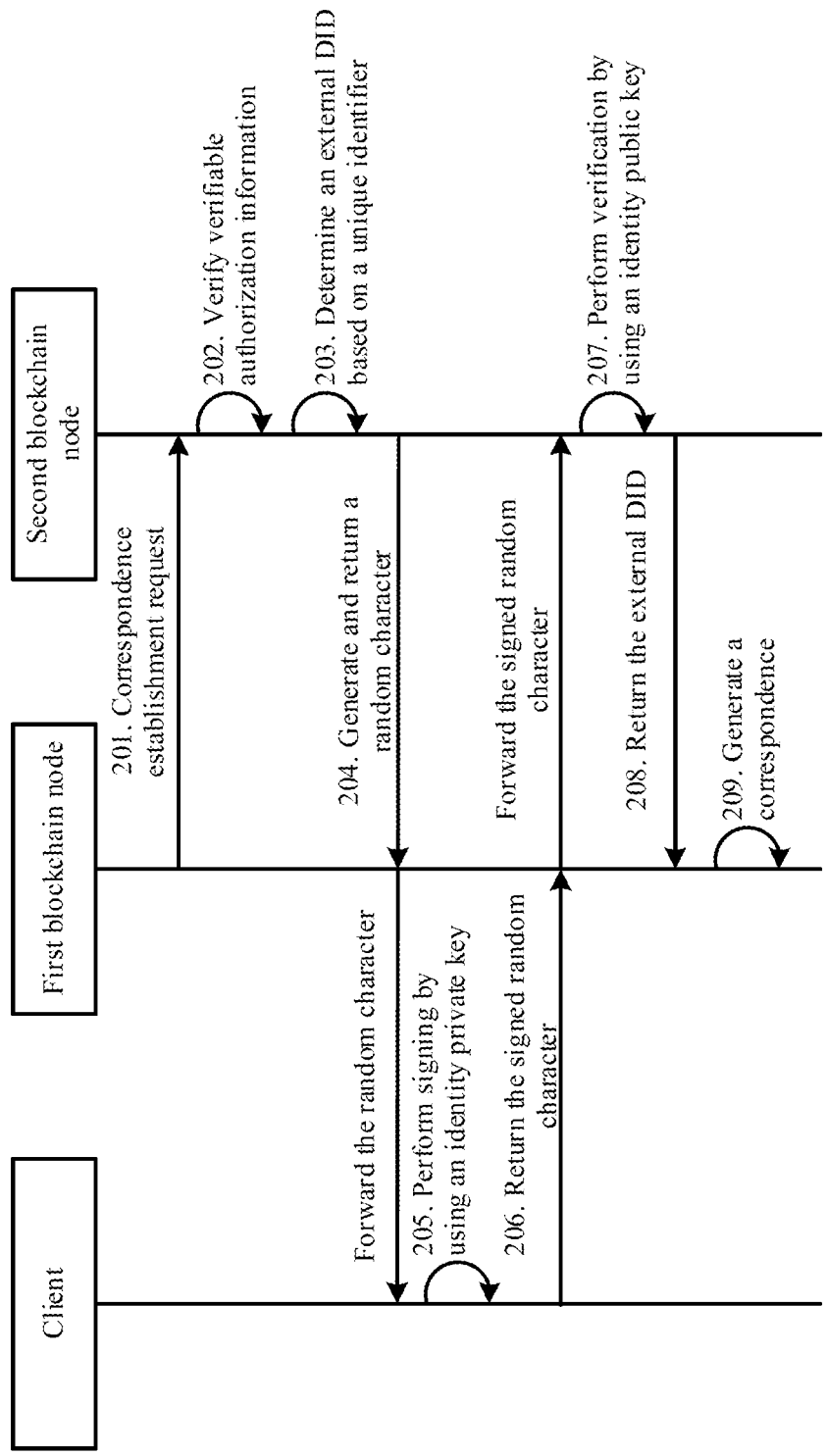
FIG. 2 is an interaction diagram illustrating a method for generating a correspondence between DIDs according to an example implementation of the present specification.

FIG. 2 is an interaction diagram illustrating a method for generating a correspondence between DIDs according to an example implementation of the present specification. As shown in FIG. 2, the method can include the following steps:

Step 201: A first blockchain node sends a correspondence establishment request for any local DID to a second blockchain node. The correspondence establishment request includes a unique identifier of an object represented by the local DID and verifiable authorization information.

In the implementation, an external DID corresponding to the local DID is provided by the second blockchain node in a second blockchain. In the present step, the first blockchain node requests the external DID from the second blockchain node by sending the correspondence establishment request to the second blockchain node.

Step 202: The second blockchain node verifies the verifiable authorization information.

In the implementation, the correspondence establishment request can include the verifiable authorization information used to prove that an owner of the local DID allows establishment of the correspondence. The verifiable authorization information can be a VC in a related technology. A verification method thereof is similar to that in the related technology. Details are omitted herein for simplicity.

Step 203: After determining that the verification of the verifiable authorization information succeeds, the second blockchain node determines, based on the unique identifier of the object represented by the local DID, the external DID registered by the object in the second blockchain.

The correspondence establishment request can further include the unique identifier of the object represented by the local DID. When determining that the verification of the verifiable authorization information succeeds, the second blockchain node can determine, by using the unique identifier, the external DID registered by the object in the second blockchain. The unique identifier is usually related to a type of the object. For example, when the type of the object is a person, the unique identifier can be information such as an ID number and a telephone number of the object. For another example, when the type of the object is a device, the unique identifier can be a factory serial number and model code of the device. Certainly, the example is merely illustrative. A specific form of the unique identifier can be determined by a person skilled in the art based on actual conditions. This is not limited in the present specification.

Step 204: The second blockchain node sends a generated random character to the first blockchain node, and the first blockchain node forwards the received random character to a client.

After the verification of the verifiable authorization information succeeds, it needs to be further verified that the object represented by the local DID and the object represented by the external DID are the same object. Therefore, the second blockchain node can generate the random character for verification.

Step 205: The client, operated by a user, signs the random character by using an identity private key of the owner of the local DID.

In practice, the first blockchain node can send the random character to the client used by the user, so that the user signs the random character through the client. For example, the client can present the random character to the user, and sign the random character by using the identity private key memorized by the user. For another example, the user can sign the random character by invoking, through an operation, the identity private key locally stored on the client.

Step 206: The client sends the signed random character to the first blockchain node, so that the first blockchain node forwards the signed random character to the second blockchain node.

Step 207: The second blockchain node verifies the received signed random character based on a maintained identity public key corresponding to the determined external DID.

As described above, in a process of registering a DID for any object in a blockchain, a corresponding DID document needs to be generated, and at least an identity public key of the object is recorded in the DID document. Therefore, when receiving the signed random character, the second blockchain node can verify the signed random character by using the identity public key stored in the DID document.

Step 208: The second blockchain node returns the determined external DID to the first blockchain node when determining that the verification succeeds.

When it is determined that the verification succeeds, it can be determined that the local DID and the external DID are DIDs registered by the same object in different blockchains. Therefore, the second blockchain node can send the external DID to the first blockchain node to generate the correspondence between the two DIDs.

Step 209: The first blockchain node generates the correspondence between the received external DID and the local DID based on the received external DID.

It can be learned from the above technical solution that, in the technical solution in the present specification, the correspondence between the local DID and the external DID registered by the object represented by the local DID in the second blockchain can be established by sending the correspondence establishment request to the second blockchain node. Based on this, the data related to the local DID can be obtained from the second blockchain. In other words, in the present specification, a correspondence between DIDs registered by a same object in different blockchains is established, so that data can be directly obtained from a blockchain in which the data related to the object has been stored, thereby avoiding a problem in the related technology that the user needs to repeatedly upload data to different blockchains, and reducing user operations.

Further, the first blockchain node in the implementation obtains the external DID from the second blockchain node, that is, the external DID is provided by an objective organization instead of directly by the user. Therefore, the obtained external DID is relatively reliable.

In addition to the second blockchain node, the user can also provide the external DID directly. This case is described below with reference to FIG. 3 and FIG. 4.

Figure 3:
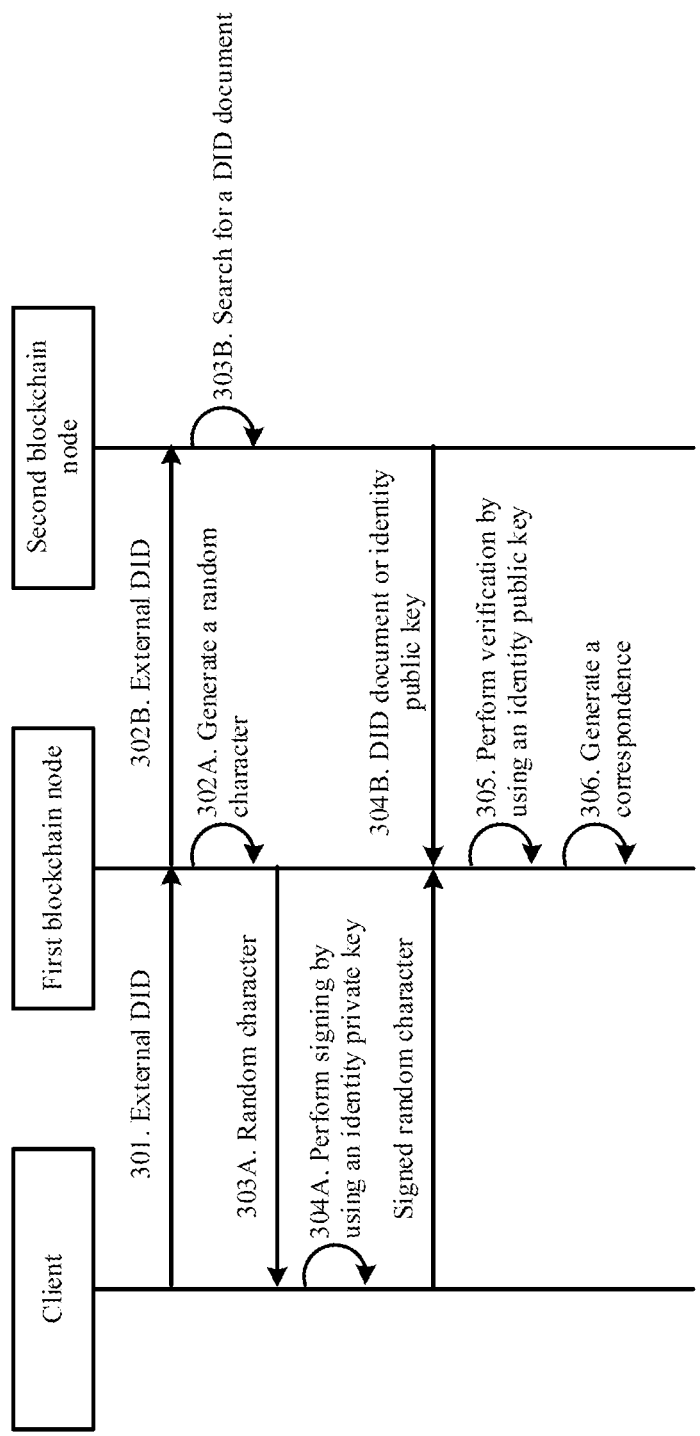
FIG. 3 is an interaction diagram illustrating another method for generating a correspondence between DIDs according to an example implementation of the present specification.

FIG. 3 is an interaction diagram illustrating another method for generating a correspondence between DIDs according to an example implementation of the present specification. As shown in FIG. 3, the method can include the following steps:

Step 301: A first blockchain node receives an external DID corresponding to any local DID from a client.

In the implementation, the external DID is directly provided by a user by using the client. For example, the user can input, into the client, the memorized external DID corresponding to the local DID. In the implementation, whether the external DID is a DID registered by an object represented by the local DID in a second blockchain needs to be determined.

Step 302A: The first blockchain node generates a random character used to verify whether the external DID corresponds to the local DID.

Step 303A: The first blockchain node sends the random character to the client.

Step 304A: The client signs, operated by the user, the received random character by using an identity private key of an owner of the local DID, and returns the signed random character to the first blockchain node.

Step 302B: The first blockchain node forwards the received external DID to a second blockchain node.

Step 303B: After receiving the external DID, the second blockchain node searches for a corresponding DID document based on the external DID.

Step 304B: The second blockchain node returns the found DID document or an identity public key in the DID document to the first blockchain node.

In the implementation, the first blockchain node needs to generate the random character and interact with the client, so that the user signs the generated random character by using the identity private key of the owner of the local DID to obtain the signed random character. In addition, the first blockchain node needs to interact with the second blockchain node to obtain the identity public key of the owner of the local DID, so as to verify the signed random character, and further prove that the external DID is indeed a DID registered by the object represented by the local DID in the second blockchain.

Step 305: The first blockchain node extracts the identity public key from the received DID document, and verifies, by using the identity public key, the signed random character returned by the client; or the first blockchain node directly verifies, by using the received identity public key, the signed random character returned by the client.

In practice, an identity public key of an owner of the external DID is stored in the DID document corresponding to the external DID. Therefore, the second blockchain node can return, to the first blockchain node, the DID document corresponding to the external DID, and the first blockchain node verifies the signed random character after extracting the identity public key from the DID document. Alternatively, the second blockchain node can directly extract the identity public key from the DID document, and send the identity public key to the first blockchain node.

Step 306: The first blockchain node generates a correspondence between the local DID and the external DID when determining that the verification succeeds.

It can be learned from the above technical solution that, in the implementation, after receiving the external DID provided by the user, the first blockchain node can verify, by generating the random character, whether the object represented by the external DID and the object represented by the local DID are the same object, and further generate the correspondence between the local DID and the external DID. Compared with the above implementation, in the implementation, the external DID can be obtained rapidly, and the first blockchain node can perform in parallel the process of obtaining the signed random character and the process of obtaining the identity public key, to establish the above correspondence rapidly.

Figure 4:
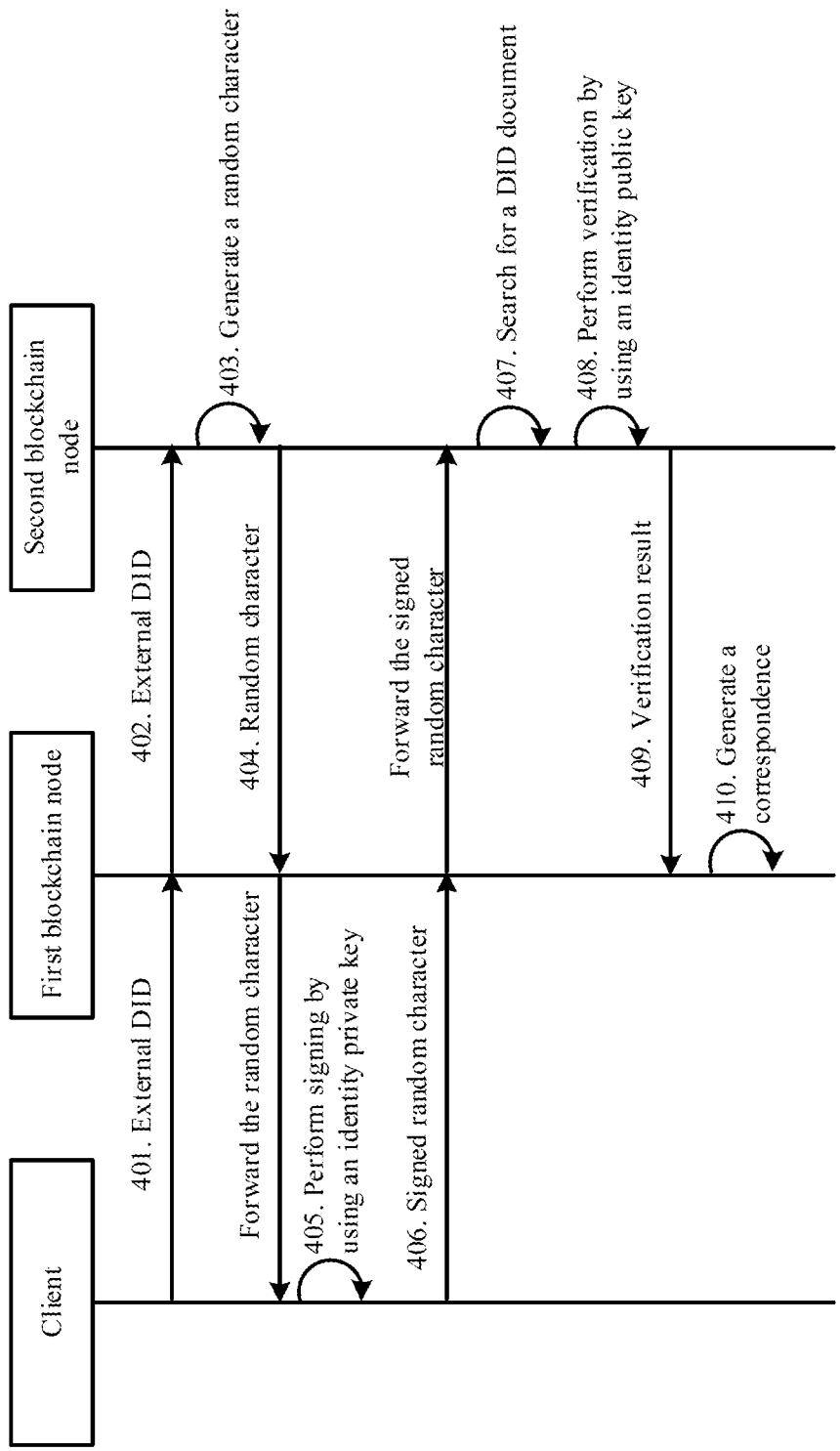
FIG. 4 is an interaction diagram illustrating still another method for generating a correspondence between DIDs according to an example implementation of the present specification.

FIG. 4 is an interaction diagram illustrating still another method for generating a correspondence between DIDs according to an example implementation of the present specification. As shown in FIG. 4, the method can include the following steps:

Step 401: A first blockchain node receives an external DID corresponding to any local DID from a client.

In the implementation, most operation methods are similar to those in the above implementation. The similar parts are omitted herein.

A difference between the implementation and the above implementation is that in the implementation, a second blockchain node generates a random character, and verifies the signed random character returned by the first blockchain node.

Step 402: The first blockchain node sends the received external DID to the second blockchain node.

Step 403: The second blockchain node generates the random character used to verify an identity of an owner of the local DID.

Step 404: The second blockchain node returns the generated random character to the first blockchain node, and the first blockchain node forwards the received random character to a client.

Step 405: The client, operated by a user, signs the received random character by using an identity private key of the owner of the local DID.

Step 406: The client sends the signed random character to the first blockchain node, and the first blockchain node forwards the received signed random character to the second blockchain node.

Step 407: The second blockchain node determines, based on the received external DID, a DID document corresponding to the received external DID.

In some implementations, the present step can be performed at any moment between step 402 and step 406. A specific performing moment can be determined by a person skilled in the art, and is not limited herein.

Step 408: The second blockchain node verifies the received signed random character by using an identity public key in the DID document.

Step 409: The second blockchain node returns an obtained verification result for the signed random character to the first blockchain node.

Step 410: The first blockchain node generates a correspondence between the local DID and the external DID when determining that the received verification result is that the verification succeeds.

Compared with the above implementation, in the implementation, the second blockchain is responsible for generating the random character, and the second blockchain performs a verification operation, so that the first blockchain node almost only needs to perform the processes of forwarding information and generating the correspondence, thereby greatly reducing occupied processing resources of the first blockchain node.

Figure 5:
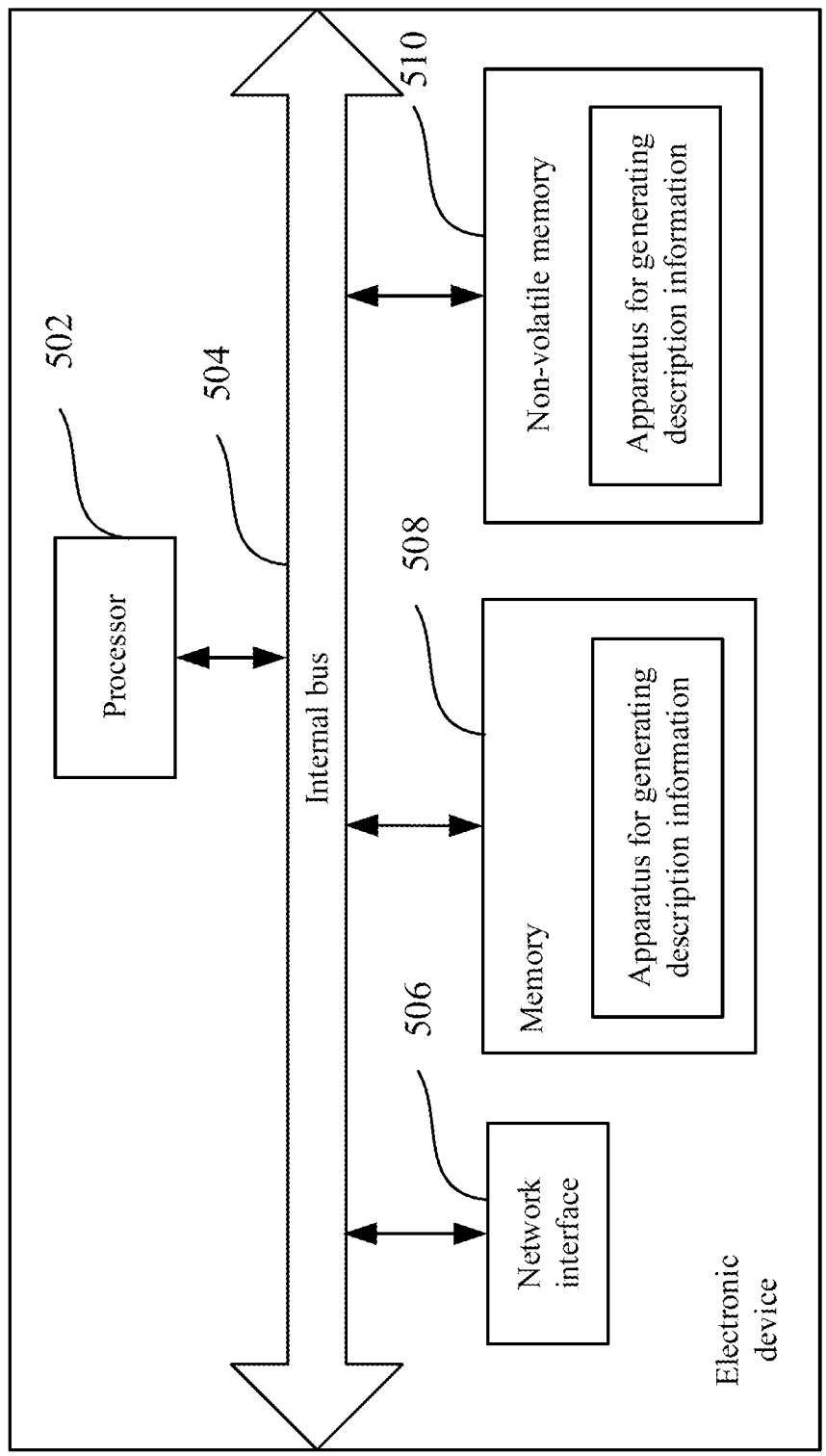
FIG. 5 is a schematic structural diagram illustrating an electronic device according to an example implementation of the present specification.

FIG. 5 is a schematic structural diagram illustrating an electronic device according to an example implementation. Referring to FIG. 5, at a hardware level, the device includes a processor 502, an internal bus 504, a network interface 506, a memory 508, and a non-volatile memory 510, and certainly, can further include hardware required for other services. The processor 502 reads a corresponding computer program from the non-volatile memory 510 to the memory 508 and then runs the computer program to form, at a logical level, an apparatus for generating description information. Certainly, in addition to a software implementation, one or more implementations of the present specification do not exclude other implementations, for example, a combination of logic devices or a combination of software and hardware. That is, execution bodies of the following procedures are not limited to various logic units, and can be hardware or logic devices.

Figure 6:
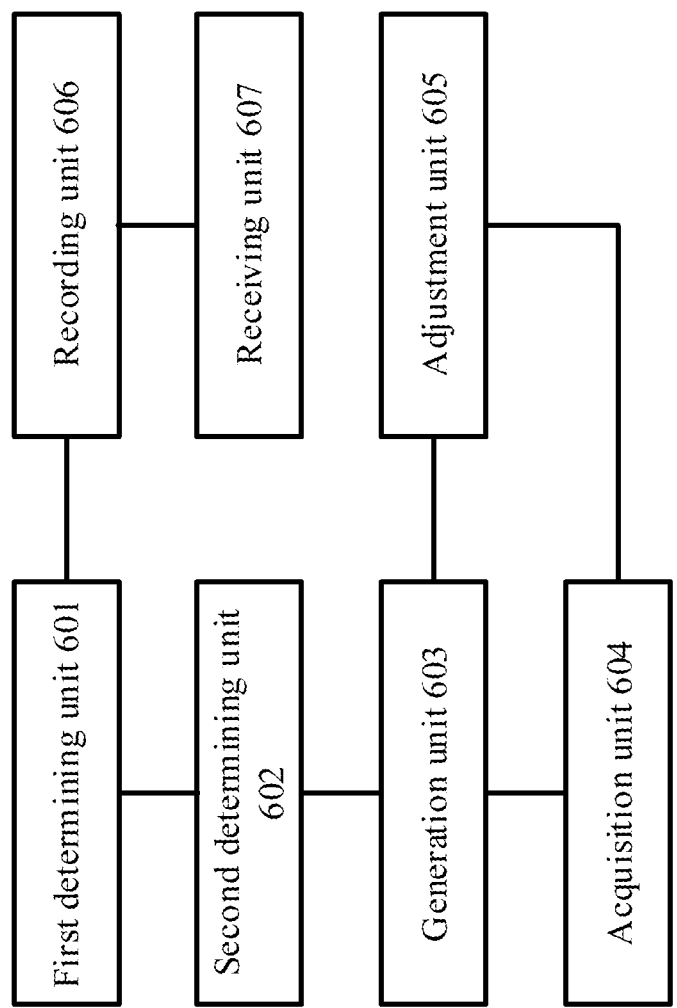
FIG. 6 is a block diagram illustrating an apparatus for generating description information according to an example implementation of the present specification.

Referring to FIG. 6, in a software implementation, the apparatus for generating description information can include: a first determining unit 601, configured to determine local DIDs registered in a first blockchain, and generate a relationship graph of all local DIDs based on data that is related to individual local DIDs and that is maintained by a first blockchain node corresponding to the first blockchain; a second determining unit 602, configured to determine, from the relationship graph and based on a target local DID corresponding to a target object, an associated local DID related to the target local DID; and a generation unit 603, configured to generate description information of the target object based on (a) an association relationship between the target local DID and the associated local DID and (b) data related to the associated local DID.

In some embodiments, the data related to individual local DIDs includes static attribute information of a corresponding object.

In some embodiments, the apparatus further includes: an acquisition unit 604, configured to obtain dynamic service data uploaded by a service system, where the dynamic service data is related to at least one local DID; and an adjustment unit 605, configured to adjust the relationship graph based on the dynamic service data.

In some embodiments, the adjustment unit 605 is further configured to perform at least one of the following: adjusting relationship data of existing local DIDs in the relationship graph; or registering, in the first blockchain, a local DID corresponding to the dynamic service data, and adding, to the relationship graph, relationship data related to the local DID corresponding to the dynamic service data.

In some embodiments, data that is related to any local DID and that is maintained by the first blockchain node is recorded on a client and is uploaded to a blockchain transaction in the first blockchain node; the data related to the local DID includes status data generated by executing the blockchain transaction; or the data related to the local DID includes data related to an external DID, and the data related to the external DID is obtained by the first blockchain node from a second blockchain based on a correspondence between the local DID and the external DID, where when it is determined that the external DID is registered by an object represented by the local DID in the second blockchain, the first blockchain node records the correspondence between the local DID and the external DID.

In some embodiments, the apparatus further includes: a recording unit 606, configured to: send a correspondence establishment request to a second blockchain node corresponding to the second blockchain, where the correspondence establishment request includes verifiable authorization information issued by an owner of the local DID, and the verifiable authorization information is used to prove that the owner of the local DID allows establishment of the correspondence; receive the external DID returned by the second blockchain node after the second blockchain node determines that verification of the verifiable authorization information succeeds; and record the correspondence between the local DID and the external DID.

In some embodiments, the apparatus further includes: a receiving unit 607, configured to receive a random character that is used to verify an identity of the owner of the local DID and that is returned by the second blockchain node, and return, to the second blockchain node, a random character signed by the owner of the local DID by using an identity private key.

The recording unit 606 is further configured to receive the external DID returned by the second blockchain node after the signed random character is verified by using an identity public key of the owner of the external DID, where the identity public key is recorded in a DID document corresponding to the external DID in the second blockchain.

In some embodiments, the recording unit 606 is further configured to: receive the external DID sent by an owner of the local DID, and send a generated random character to the owner of the local DID, so that the owner of the local DID signs the random character based on an identity private key; send the received external DID to a second blockchain node, and when an identity public key that is returned by the second blockchain node and that is recorded in a DID document corresponding to the external DID in the second blockchain is received, verify, based on the returned identity public key, the random character signed by the owner of the local DID; and generate and record the correspondence between the local DID and the external DID when the verification succeeds.

In some embodiments, the recording unit 606 is further configured to: receive the external DID sent by an owner of the local DID, and send the external DID to a second blockchain node, so that the second blockchain node generates a random character used to verify an identity of the owner of the local DID; receive the random character returned by the second blockchain node, and after the random character is signed by the owner of the local DID by using an identity private key, send the signed random character to the second blockchain node; and generate and record the correspondence between the local DID and the external DID based on received verification success information returned by the second blockchain node after the signed random character is verified by using an identity public key, where the identity public key is recorded in a DID document corresponding to the external DID in the second blockchain.

In some embodiments, each local DID includes a prefix part and a suffix ID, and the suffix ID meets the Base64 encoding rule.

In some embodiments, a type of an object represented by a local DID includes at least one of: a person, an organization, a device, assets, or space.

To provide further context for embodiments of this specification, and as introduced herein, distributed ledger systems (DLSs) (which can also be referred to as consensus networks), made up of peer-to-peer nodes), and blockchain networks, enable participating entities to securely, and immutably, conduct transactions and store data. Although the term blockchain is generally associated with particular networks, and/or use cases, blockchain is used herein to generally refer to a DLS without reference to any particular use case.

A blockchain is a data structure that stores transactions in a way that the transactions are immutable. Thus, the recording of transactions on a blockchain is reliable and trustworthy. A blockchain includes one or more blocks. Each block in the chain is linked to a previous block immediately before it in the chain by including a cryptographic hash of the previous block. Each block also includes a timestamp, its own cryptographic hash, and one or more transactions. Within a block, the transactions, which have already been verified by the nodes of the blockchain network, are hashed and encoded into a Merkle tree. The Merkle tree is a data structure in which each leaf node includes a hash on a corresponding transaction, and each non-leaf node includes a hash on the concatenation of the hashes in its children. With this process continuing up the tree to the root of the entire tree, the root node includes a hash that is representative of all data in the tree. A hash purporting to be of a transaction stored in the tree can be quickly verified by determining whether it is consistent with the structure of the tree.

Where a blockchain is a decentralized or at least partially decentralized data structure for storing transactions, a blockchain network is a network of computing nodes that manage, update, and maintain one or more blockchains by broadcasting, verifying and validating transactions, etc. As introduced above, a blockchain network can be provided as a public blockchain network, a private blockchain network, or a consortium blockchain network. Embodiments of this specification are described in further detail herein with reference to a consortium blockchain network. However, embodiments of this specification can be realized in any appropriate type of blockchain network.

In general, a consortium blockchain network is private among the participating entities. In a consortium blockchain network, the consensus process is controlled by an authorized set of nodes, referred to as consensus nodes, one or more of which are operated by a respective entity (a financial institution, insurance company, etc.). For example, a consortium of ten (10) entities (financial institutions, insurance companies, etc.) can operate a consortium blockchain network, each of which operates at least one node in the consortium blockchain network.

In some examples, within a consortium blockchain network, a global blockchain is provided as a blockchain that is replicated across all nodes. That is, all consensus nodes are typically in perfect state consensus with respect to the global blockchain. To achieve consensus (agreement to the addition of a block to a blockchain), a consensus protocol or algorithm is implemented within the consortium blockchain network. For example, the consortium blockchain network can implement a practical Byzantine fault tolerance (PBFT) consensus, described in further detail below.

Figure 7:
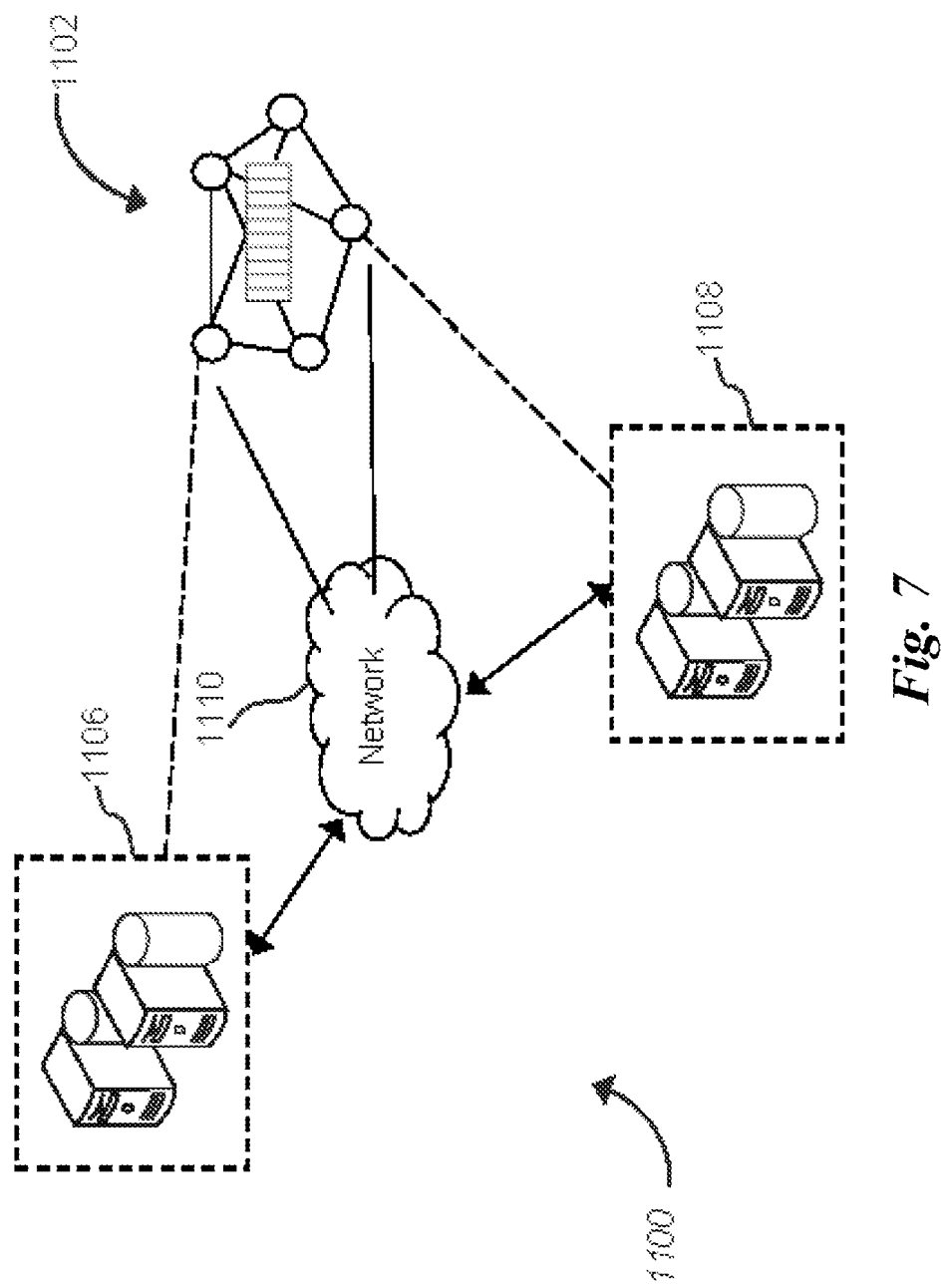
FIG. 7 is a diagram illustrating an example of an environment that can be used to execute embodiments of this specification.

FIG. 7 is a diagram illustrating an example of an environment 1100 that can be used to execute embodiments of this specification. In some examples, the environment 1100 enables entities to participate in a consortium blockchain network 1102. The environment 1100 includes a plurality of computing devices 1106, 1108, and a network 1110. In some examples, the network 1110 includes a local area network (LAN), wide area network (WAN), the Internet, or a combination thereof, and connects web sites, user devices (computing devices), and back-end systems. In some examples, the network 1110 can be accessed over a wired and/or a wireless communications link. In some examples, the network 1110 enables communication with, and within the consortium blockchain network 1102. In general the network 1110 represents one or more communication networks. In some cases, the network 1110 includes network hardware such as switches, routers, repeaters, electrical cables and optical fibers, light emitters and receivers, radio transmitters and receivers, and the like. In some cases, the computing devices 1106, 1108 can be nodes of a cloud computing system (not shown), or each computing device 1106, 1108 can be a separate cloud computing system including a number of computers interconnected by a network and functioning as a distributed processing system.

In the depicted example, the computing systems 1106, 1108 can each include any appropriate computing system that enables participation as a node in the consortium blockchain network 1102. Examples of computing devices include, without limitation, a server, a desktop computer, a laptop computer, a tablet computing device, and a smartphone. In some examples, the computing systems 1106, 1108 host one or more computer-implemented services for interacting with the consortium blockchain network 1102. For example, the computing system 1106 can host computer-implemented services of a first entity (user A), such as a transaction management system that the first entity uses to manage its transactions with one or more other entities (other users). The computing system 1108 can host computer-implemented services of a second entity (user B), such as a transaction management system that the second entity uses to manage its transactions with one or more other entities (other users). In the example of FIG. 7, the consortium blockchain network 1102 is represented as a peer-to-peer network of nodes, and the computing systems 1106, 1108 provide nodes of the first entity and second entity, respectively, which participate in the consortium blockchain network 1102.

Figure 8:
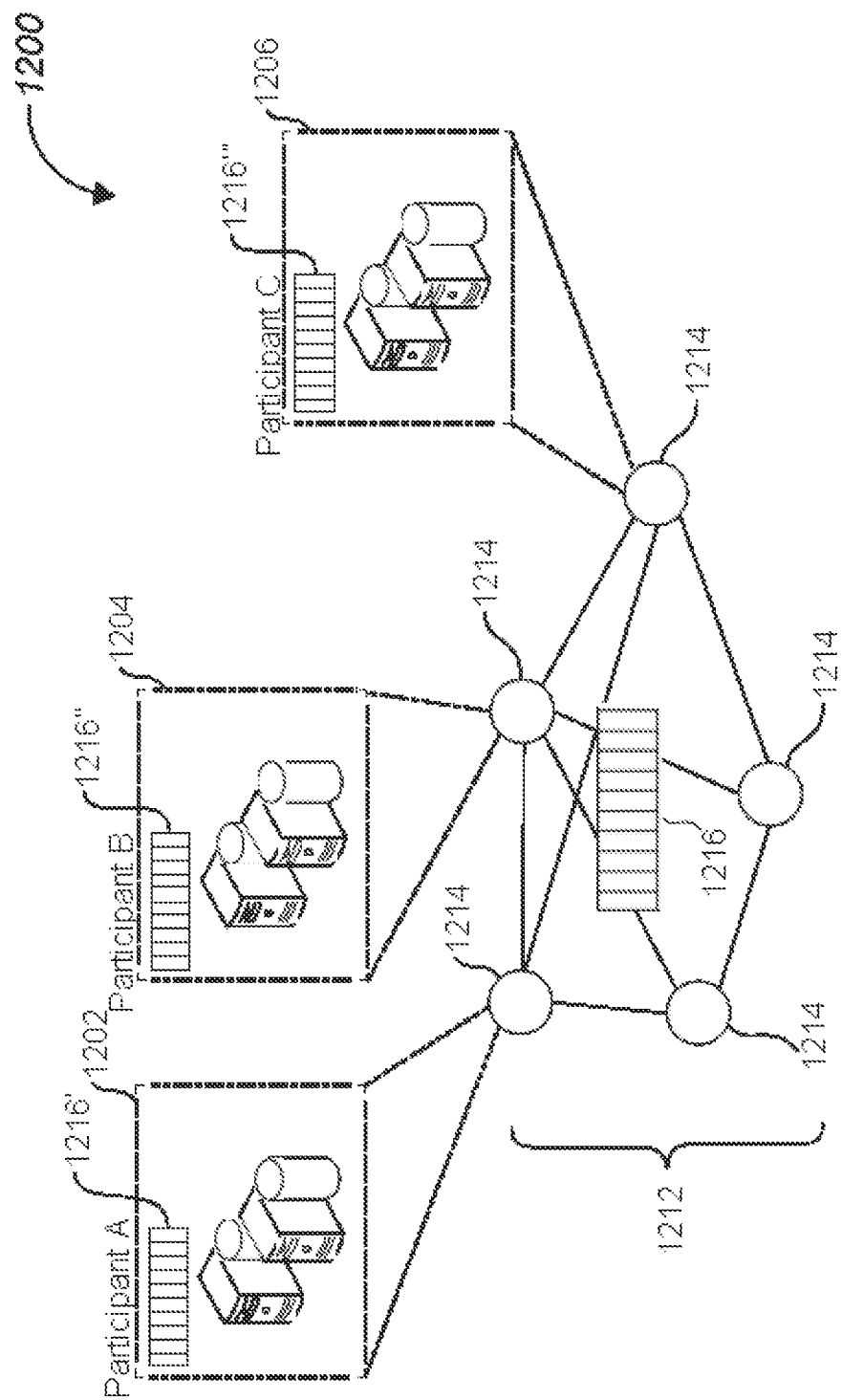
FIG. 8 depicts an example architecture in accordance with embodiments of this specification.

FIG. 8 depicts an example architecture 1200 in accordance with embodiments of this specification. The example architecture 1200 includes participant systems 1202, 1204, 1206 that correspond to Participant A, Participant B, and Participant C, respectively. Each participant (user, enterprise, etc.) participates in a blockchain network 1212 provided as a peer-to-peer network including a plurality of nodes 1214, at least some of which immutably record information in a blockchain 1216. Although a single blockchain 1216 is schematically depicted within the blockchain network 1212, multiple copies of the blockchain 1216 are provided, and are maintained across the blockchain network 1212, as described in further detail herein.

In the depicted example, each participant system 1202, 1204, 1206 is provided by, or on behalf of, Participant A, Participant B, and Participant C, respectively, and functions as a respective node 1214 within the blockchain network 1212. As used herein, a node generally refers to an individual system (computer, server, etc.) that is connected to the blockchain network 1212, and enables a respective participant to participate in the blockchain network. In the example of FIG. 8, a participant corresponds to each node 1214. It is contemplated, however, that a participant can operate multiple nodes 1214 within the blockchain network 1212, and/or multiple participants can share a node 1214. In some examples, the participant systems 1202, 1204, 1206 communicate with, or through, the blockchain network 1212 using a protocol (hypertext transfer protocol secure (HTTPS)), and/or using remote procedure calls (RPCs).

Nodes 1214 can have varying degrees of participation within the blockchain network 1212. For example, some nodes 1214 can participate in the consensus process (as miner nodes that add blocks to the blockchain 1216), while other nodes 1214 do not participate in the consensus process. As another example, some nodes 1214 store a complete copy of the blockchain 1216, while other nodes 1214 only store copies of portions of the blockchain 1216. For example, data access privileges can limit the blockchain data that a respective participant stores within its respective system. In the example of FIG. 8, the participant systems 1202, 1204 store respective, complete copies 1216', 1216", 1216''' of the blockchain 1216. In the descriptions herein, nodes 1214 of the blockchain network 1212 are also referred to as "participant user" for descriptive purposes. In some embodiments, some or all of the participant users 1214 participate in the consensus process and are referred to as "consensus nodes." The consensus nodes for the blockchain 1216 may also include other nodes not selected from the participant users 1214. In some other embodiments, consensus nodes for adding blocks to the blockchain 1216 do not overlap with the participant users 1214 that propose blocks to be added to the blockchain 1216.

A blockchain, such as the blockchain 1216 of FIG. 8, is made up of a chain of blocks, each block storing data. Examples of data include transaction data representative of a transaction between two or more participants. While transactions are used herein by way of non-limiting example, any appropriate data can be stored in a blockchain (documents, images, video, audio, etc.). Examples of a transaction can include, without limitation, exchanges of something of value (assets, products, services, currency, etc.) or occurrence of some events or activities. The transaction data is immutably stored within the blockchain. That is, an undetectable change cannot be made to the transaction data.

Before being stored in a block, the transaction data is hashed. Hashing is a process of transforming the transaction data, typically provided as string data, into a fixed-length hash value, typically provided as string data. It is not possible to un-hash the hash value to obtain the transaction data. Hashing ensures that even a slight change in the transaction data results in a completely different hash value. Further, and as noted above, the hash value is of a fixed length. That is, no matter the size of the transaction data the length of the hash value is fixed. Hashing includes processing the transaction data through a hash function to generate the hash value. An example of a hash function includes, without limitation, the secure hash algorithm (SHA)-256, which outputs 256-bit hash values.

Transaction data of multiple transactions are hashed and stored in a block. For example, hash values of two transactions are provided, and are themselves hashed to provide another hash. This process is repeated until, for all transactions to be stored in a block, a single hash value is provided. This hash value is referred to as a Merkle root hash, and is stored in a header of the block. A change in any of the transactions will result in change in its hash value, and ultimately, a change in the Merkle root hash.

Blocks are added to the blockchain through a consensus protocol. Multiple nodes within the blockchain network participate in the consensus protocol, and perform work to have a block added to the blockchain. Such nodes are referred to as consensus nodes. PBFT, introduced above, is used as a non-limiting example of a consensus protocol. The consensus nodes execute the consensus protocol to add transactions to the blockchain, and update the overall state of the blockchain network.

In further detail, for example, the consensus node generates a block header, hashes all of the transactions in the block, and combines the hash value in pairs to generate further hash values until a single hash value is provided for all transactions in the block (the Merkle root hash). This Merkle root hash is added to the block header. The consensus node also determines the hash value of the most recent block in the blockchain (the last block added to the blockchain) and adds the hash value of the most recent block into the block header. The consensus node also adds a nonce value, and a timestamp to the block header. The block header is hashed, which becomes the hash value of the block.

In general, PBFT provides a practical Byzantine state machine replication that tolerates Byzantine faults (malfunctioning nodes, malicious nodes, etc.). This is achieved in PBFT by assuming that faults will occur (assuming the existence of independent node failures, and/or manipulated messages sent by consensus nodes). In PBFT, the consensus nodes are provided in a sequence that includes a primary consensus node and backup consensus nodes. The primary consensus node is periodically changed. Transactions are added to the blockchain by all consensus nodes within the blockchain network reaching an agreement as to the world state of the blockchain network. In this process, messages are transmitted between consensus nodes, and each consensus nodes proves that a message is received from a specified peer node and verifies that the message was not modified during transmission.

In PBFT, the consensus protocol is provided in multiple phases with all consensus nodes beginning in the same state. To begin, a client sends a request to the primary consensus node to invoke a service operation (execute a transaction within the blockchain network). In response to receiving the request, the primary consensus node multicasts the request to the backup consensus nodes. The backup consensus nodes execute the request, and each sends a reply to the client. The client waits until a threshold number of replies are received. In some examples, the client waits for f+1 replies to be received, where f is the maximum number of faulty consensus nodes that can be tolerated within the blockchain network. The final result is that a sufficient number of consensus nodes come to an agreement on the order of the record that is to be added to the blockchain, and the record is either accepted, or rejected.

A consensus algorithm refers to a specific mechanism or terms, based on which a transaction or a block is verified and validated to be added into a blockchain. To that extent, a consensus algorithm is viewed as a specific implementation agreement adapted to follow rules of a consensus protocol. Different consensus algorithms may be created for different blockchain networks 1212 or different blockchains 1216, which all comply with a same consensus protocol.

In some blockchain networks, cryptography is implemented to maintain privacy of transactions. For example, if two nodes want to keep a transaction private, such that other nodes in the blockchain network cannot discern details of the transaction, the nodes can encrypt the transaction data. An example of cryptography includes, without limitation, symmetric encryption and asymmetric encryption. Symmetric encryption refers to an encryption process that uses a single key for both encryption (generating ciphertext from plaintext), and decryption (generating plaintext from ciphertext). In symmetric encryption, the same key is available to multiple nodes, so each node can encrypt/decrypt transaction data.

Asymmetric encryption uses keys pairs that each include a private key, and a public key, the private key being known only to a respective node, and the public key being known to any or all other nodes in the blockchain network. A node can use the public key of another node to encrypt data, and the encrypted data can be decrypted using other node's private key. For example, and referring again to FIG. 8, Participant A can use Participant B's public key to encrypt data, and send the encrypted data to Participant B. Participant B can use its private key to decrypt the encrypted data (ciphertext) and extract the original data (plaintext). Messages encrypted with a node's public key can only be decrypted using the node's private key.

Asymmetric encryption is used to provide digital signatures, which enables participants in a transaction to confirm other participants in the transaction, as well as the validity of the transaction. For example, a node can digitally sign a message, and another node can confirm that the message was sent by the node based on the digital signature of Participant A. Digital signatures can also be used to ensure that messages are not tampered with in transit. For example, and again referencing FIG. 8, Participant A is to send a message to Participant B. Participant A generates a hash of the message, and then, using its private key, encrypts the hash to provide a digital signature as the encrypted hash. Participant A appends the digital signature to the message, and sends the message with digital signature to Participant B. Participant B decrypts the digital signature using the public key of Participant A, and extracts the hash. Participant B hashes the message and compares the hashes. If the hashes are same, Participant B can confirm that the message was indeed from Participant A, and was not tampered with.

In some embodiments, a system implementing some embodiments of the presently disclosed technology can be implemented within the blockchain environment 1100 of FIG. 7 and using the blockchain architecture 1200 of FIG. 8.

The systems, apparatuses, modules, or units described in the above implementations can be implemented by a computer chip or an entity, or can be implemented by a product with a certain function. A typical implementation device is a computer. A specific form of the computer can be a personal computer, a laptop computer, a cellular phone, a camera phone, a smart phone, a personal digital assistant, a media player, a navigation device, an email receiving and sending device, a game console, a tablet computer, a wearable device, or a combination of several of these devices.

In a typical configuration, the computer includes one or more processors (CPU), an input/output interface, a network interface, and a memory.

The memory can include at least one of a non-permanent memory in a computer-readable medium, a random access memory (RAM), or a non-volatile memory, such as a read-only memory (ROM) or a flash memory (flash RAM). The memory is an example of the computer-readable medium. The computer-readable medium includes permanent and non-permanent media and removable and non-removable media, and information can be stored by using any method or technology. The information can be a computer-readable instruction, a data structure, a program module, or other data. Examples of the computer readable medium include, but are not limited to, a phase change random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read only memory (CD-ROM), a digital versatile disc (DVD) or another optical storage, a magnetic cassette, a disk storage, a quantum memory, a graphene-based storage medium or another magnetic storage device or any another non-transmission medium, which can be configured to store information that can be accessed by a computing device. According to the definition in the present specification, the computer-readable medium does not include transitory media, such as a modulated data signal and carrier.

It should further be noted that the terms "comprise," "include" or any other variants thereof are intended to cover non-exclusive inclusion, so that a process, method, commodity or device including a series of elements not only includes those elements, but also includes other elements that are not explicitly listed, or also includes elements inherent to such a process, method, commodity, or device. If there are no more restrictions, the element defined by the sentence "including a . . . " does not exclude the existence of other identical elements in the process, method, commodity, or device that includes the element.

The above describes the specific implementations of the present specification. Other implementations are within the scope of the appended claims. In some cases, the actions or steps described in the claims can be performed in an order different from that in the implementations and still can achieve desired results. In addition, the processes described in the accompanying drawings do not necessarily require the specific shown order or the sequential order to achieve the desired results. In some implementations, multitasking and parallel processing are also possible or can be advantageous.

Terms used in one or more implementations of the present specification are only for the purpose of describing specific implementations, but are not intended to limit the one or more implementations of the present specification. The singular forms of "a," "said" and "the" used in the one or more implementations of the present specification and the appended claims are also intended to include plural forms, unless the context clearly indicates other meanings. It should also be understood that the term "and/or" used in the present specification refers to and includes any or all possible combinations of one or more associated listed items.

It should be understood that although the terms "first," "second," "third," and the like can be used in the one or more implementations of the present specification, the information should not be limited to these terms. These terms are merely used to distinguish between the same types of information. For example, without departing from the scope of the one or more implementations of the present specification, first information can also be referred to as second information, and similarly, the second information can also be referred to as the first information. Depending on the context, the word "if" used herein can be interpreted as "when," "as," or "in response to determining."

The above shows merely preferred implementations of one or more implementations of the present specification, and is not intended to limit the one or more implementations of the present specification. Any modification, equivalent replacement, improvement, and the like made within the spirit and principle of the one or more implementations of the present specification shall fall within the protection scope of the one or more implementations of the present specification.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for generating description information for blockchain objects, comprising:
   determining a plurality of local decentralized identifiers (DIDs) registered in a first blockchain;
   generating a relationship graph of the plurality of local DIDs based on data that is related to individual local DIDs and that is maintained by a first node of a blockchain network that implements the first blockchain, wherein the data related to individual local DIDs includes data related to an external DID, and the data related to the external DID is obtained by the first node from another blockchain network based on a correspondence between a local DID and the external DID, wherein responsive to determining the external DID is a DID that is of an object represented by the local DID and that is registered in a second blockchain implemented by the another blockchain network, the first node records the correspondence between the local DID and the external DID by at least:
      receiving the external DID returned by a second node of the another blockchain network after a signed random character is verified by using an identity public key of an owner of the external DID, wherein the signed random character is signed by an owner of the local DID by using an identity private key and wherein the identity public key is recorded in a DID document corresponding to the external DID in the second blockchain;
   determining, from the relationship graph and based on a target local DID corresponding to a target object, an associated local DID related to the target local DID; and
   generating description information of the target object based on (a) an association relationship between the target local DID and the associated local DID and (b) data related to the associated local DID.

2. The method according to claim 1, wherein the data related to individual local DIDs includes static attribute information of a corresponding object.

3. The method according to claim 2, further comprising:
   obtaining dynamic service data uploaded by a service system, wherein the dynamic service data is related to at least one local DID; and
   adjusting the relationship graph based on the dynamic service data.

4. The method according to claim 3, wherein adjusting the relationship graph based on the dynamic service data includes performing at least one of:
   adjusting relationship data of local DIDs existing in the relationship graph; or registering, in the first blockchain, a local DID corresponding to the dynamic service data, and adding, to the relationship graph, relationship data related to the local DID corresponding to the dynamic service data.

5. The method according to claim 1, wherein
data that is related to individual local DIDs and that is maintained by the first node is recorded on a client and is uploaded to a blockchain transaction in the first node; or
the data related to individual local DIDs includes status data generated by executing the blockchain transaction.

6. The method according to claim 1, wherein the first node records the correspondence between the local DID and the external DID further by:
sending, by the first node, a correspondence establishment request to the second node of the another blockchain network, wherein the correspondence establishment request includes verifiable authorization information issued by the owner of the local DID, and the verifiable authorization information is used to prove that the owner of the local DID allows establishment of the correspondence.

7. The method according to claim 6, further comprising:
receiving, by the first node, a random character that is used to verify an identity of the owner of the local DID and that is returned by the second node; and
returning, to the second node, the signed random character.

8. The method according to claim 1, wherein each local DID of the plurality of local DIDs includes a prefix part and a suffix ID, and the suffix ID meets a Base64 encoding rule.

9. The method according to claim 1, wherein a type of an object represented by a local DID of the plurality of local DIDs includes at least one of:
a person, an organization, a device, assets, or space.

10. A non-transitory computer readable medium storing contents that, when executed by one or more processors, cause the one or more processors to perform actions comprising:
determining a plurality of local decentralized identifiers (DIDs) registered in a first blockchain;
generating a relationship graph of the plurality of local DIDs based on data that is related to individual local DIDs and that is maintained by a first node of a blockchain network that implements the first blockchain, wherein the data related to individual local DIDs includes data related to an external DID, and the data related to the external DID is obtained by the first node from another blockchain network based on a correspondence between a local DID and the external DID, wherein responsive to determining the external DID is a DID that is of an object represented by the local DID and that is registered in a second blockchain implemented by the another blockchain network, the first node records the correspondence between the local DID and the external DID by at least:
receiving the external DID returned by a second node of the another blockchain network after a signed random character is verified by using an identity public key of an owner of the external DID, wherein the signed random character is signed by an owner of the local DID by using an identity private key and wherein the identity public key is recorded in a DID document corresponding to the external DID in the second blockchain;
determining, from the relationship graph and based on a target local DID corresponding to a target object, an associated local DID related to the target local DID; and
generating description information of the target object based on (a) an association relationship between the target local DID and the associated local DID and (b) data related to the associated local DID.

11. The computer readable medium according to claim 10, wherein
data that is related to individual local DIDs and that is maintained by the first node is recorded on a client and is uploaded to a blockchain transaction in the first node; or
the data related to individual local DIDs includes status data generated by executing the blockchain transaction.

12. The computer readable medium according to claim 10, wherein the first node records the correspondence between the local DID and the external DID further by:
sending, by the first node, a correspondence establishment request to the second node of the another blockchain network, wherein the correspondence establishment request includes verifiable authorization information issued by the owner of the local DID, and the verifiable authorization information is used to prove that the owner of the local DID allows establishment of the correspondence.

13. The computer readable medium according to claim 12, wherein the actions further comprise:
receiving, by the first node, a random character that is used to verify an identity of the owner of the local DID and that is returned by the second node; and
returning, to the second node, the signed random character.

14. The computer readable medium according to claim 10, wherein each local DID of the plurality of local DIDs includes a prefix part and a suffix ID, and the suffix ID meets a Base64 encoding rule.

15. A system, comprising:
one or more processors; and
memory storing contents that, when executed by the one or more processors, cause the system to perform actions comprising:
determining a plurality of local decentralized identifiers (DIDs) registered in a first blockchain;
generating a relationship graph of the plurality of local DIDs based on data that is related to individual local DIDs and that is maintained by a first node of a blockchain network that implements the first blockchain, wherein the data related to individual local DIDs includes data related to an external DID, and the data related to the external DID is obtained by the first node from another blockchain network based on a correspondence between a local DID and the external DID, wherein responsive to determining the external DID is a DID that is of an object represented by the local DID and that is registered in a second blockchain implemented by the another blockchain network, the first node records the correspondence between the local DID and the external DID by at least:
receiving the external DID returned by a second node of the another blockchain network after a signed random character is verified by using an identity public key of an owner of the external DID, wherein the signed random character is signed by an owner of the local DID by using an identity private key and wherein the identity public key is recorded in a DID document corresponding to the external DID in the second blockchain;

determining, from the relationship graph and based on a target local DID corresponding to a target object, an associated local DID related to the target local DID; and generating description information of the target object based on (a) an association relationship between the target local DID and the associated local DID and (b) data related to the associated local DID.

16. The system according to claim 15, wherein the data related to individual local DIDs includes static attribute information of a corresponding object.

17. The system according to claim 16, wherein the actions further comprise:

obtaining dynamic service data uploaded by a service system, wherein the dynamic service data is related to at least one local DID; and adjusting the relationship graph based on the dynamic service data.

18. The system according to claim 17, wherein adjusting the relationship graph based on the dynamic service data includes performing at least one of:

adjusting relationship data of local DIDs existing in the relationship graph; or registering, in the first blockchain, a local DID corresponding to the dynamic service data, and adding, to the relationship graph, relationship data related to the local DID corresponding to the dynamic service data.

19. The system according to claim 15, wherein a type of an object represented by a local DID of the plurality of local DIDs includes at least one of:

a person, an organization, a device, assets, or space.

* * * * *